UNITED STATES PATENT OFFICE.

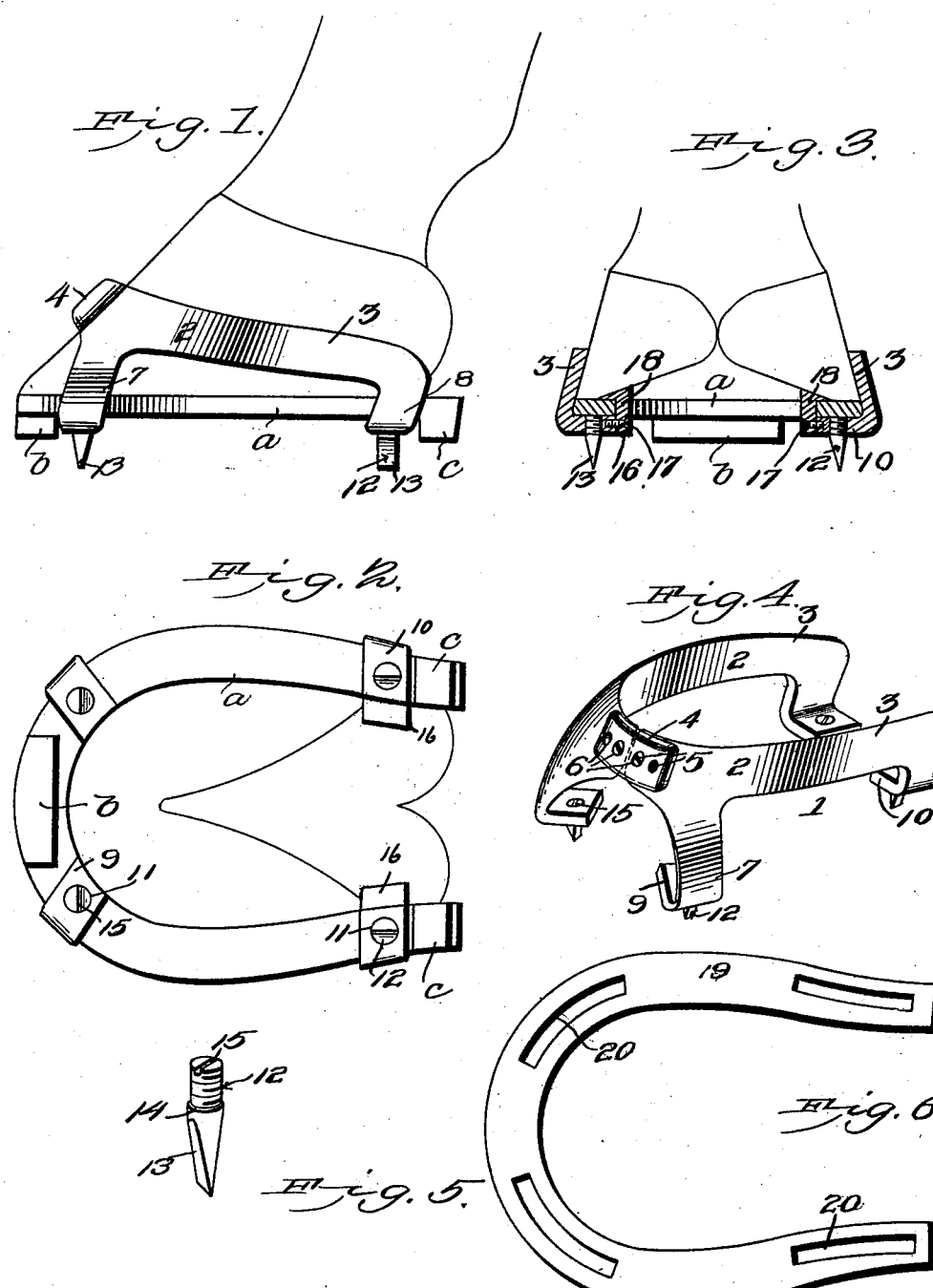

DAVID WESLEY BARR, OF SIOUX CITY, IOWA.

ADJUSTABLE CLAMP-HORSESHOE.

SPECIFICATION forming part of Letters Patent No. 722,935, dated March 17, 1903.

Application filed April 4, 1902. Serial No. 101,389. (No model.)

*To all whom it may concern:*

Be it known that I, DAVID WESLEY BARR, a citizen of the United States, residing at Sioux City, in the county of Woodbury and State of Iowa, have invented a new and useful Adjustable Clamp-Horseshoe, of which the following is a specification.

My invention is an improved adjustable clamp-horseshoe adapted to be readily attached to the hoof, adjusted to fit hoofs which vary in size, and to be readily removed from the hoof, and by means of which a horse may be provided with sharpened calks to prevent him from slipping on ice in cold weather, thus enabling a horse to be readily "sharp shod" without the necessity of removing the old shoes.

My invention consists in the peculiar construction and combination of devices hereinafter fully set forth and claimed.

In the accompanying drawings, Figure 1 is side elevation of an adjustable clamp-horseshoe embodying my improvements, showing the same in position on a horse's hoof in addition to the ordinary shoe. Fig. 2 is an inverted plan view of the same. Fig. 3 is a transverse sectional view of the same. Fig. 4 is a detail perspective view of my improved adjustable clamp-horseshoe, showing the same removed from the hoof. Fig. 5 is a detail perspective view of one of the removable and adjustable calks. Fig. 6 is a detail plan view of a clamp-plate adapted for use in connection with my improved horseshoe on an un-shod hoof.

The clamp-horseshoe 1 comprises a pair of members 2, adapted to receive a hoof between them and to fit on the outside of the hoof, the band portions 3 passing around the hoof at some distance from the bottom thereof, and the said sections 2 are connected together at the toe by a transversely-disposed plate 4, which overlaps the contiguous front ends or toe portions of the sections 2 and is secured thereto by means of screws 5 or other suitable devices. The said connecting-plate 4 is provided with a plurality of adjusting-openings 6 to receive the screws 5 and by which means the sections 2 may be adjusted laterally to narrow or widen the clamp-shoe, and hence adapt the same to fit hoofs which vary in size. At the toe and heel portions of the sections 2 are depending arms 7 8, respectively, the lower ends of which are turned inwardly at right angles, as at 9 10, to form lugs which bear under the permanent or ordinary horseshoe *a*. The lugs 9 are adapted to bear under the shoe *a* behind the toe-calk *b* thereof, and the lugs 10 are adapted to bear under said shoe *a* just in advance of the heel-calks *c*. Each of the lugs 9 10 is provided with a threaded opening 11 to receive the upper screwthreaded stem or shank 12 of a removable sharpened calk 13. The latter are preferably formed as is shown in Fig. 5 and provided with shoulders 14 to bear under the lugs; but the said calks 13 may be otherwise constructed within the scope of my invention, and I do not limit myself in this particular.

In the upper end of the threaded shank 12 of each calk 13 is a slot 15, adapted to receive a screw-driver, by which means the shanks may be readily removed from the lugs in the event that the calks become broken off from their shanks.

In order to securely clamp the heel portions of the adjustable and removable clamp-shoe to the shoe *a*, I provide clamp-plates 16, which are of the form shown in Fig. 3, are detachably secured to the inner ends of the heel-lugs 10, as by screws 17, and are provided at their upper ends with outwardly-extending flanges 18, which bear upon the upper side of the shoe *a*, between the latter and the under side of the hoof. These plates 16 are secured to the heel-lugs 10 after the adjustable clamp-horseshoe has been placed on the hoof and its toe and heel lugs engaged with the under side of the permanent or ordinary shoe.

To enable my improved adjustable clamp-horseshoe to be attached to a bare hoof, I provide a foot-plate 19, such as is shown in Fig. 6, which is of the form of an ordinary horseshoe, is flat or plane on its under side, and is provided in its under side at the toe and heel with grooves 20 to receive the upper ends of the threaded shanks of the calks 13. This foot-plate is placed between the bottom of the hoof and the heel and toe lugs of my adjustable clamp-horseshoe and is not permanently secured to the hoof in any manner, the adjustable clamp-horseshoe serving to secure the foot-plate in place and the latter forming an efficient bearing for the lugs, removable calks, and the clamp-plates of the adjustable clamp-horseshoe.

It will be understood that my improved adjustable clamp-horseshoe may be readily attached to a hoof over an ordinary shoe and used in connection therewith when the conditions require that a horse be "sharp shod" and that the same may be removed when the conditions no longer exist.

Having thus described my invention, I claim—

1. A horseshoe-clamp having side members, each comprising a band portion to bear on the hoof, and downturned arms having their lower ends turned inwardly to form toe and heel lugs to bear under the shoe, a rigid connecting-plate to which the front portions of said side members are connected, and clamp-plates detachably secured to the heel-lugs and having outturned flanges to bear on the upper side of the shoe, substantially as described.

2. A horseshoe-clamp comprising side members to bear on opposite sides of a hoof, and having inturned lugs, a rigid adjustable connection between the front ends of the side members, a foot-plate to bear on the lugs and having vertical slots, and calks having screw-shanks engaging threaded openings in the lugs and coincident with the slots in the foot-plate, substantially as described.

3. A horseshoe-clamp comprising side members to bear on opposite sides of a hoof and having inturned lugs to bear under a shoe, near the toe and heel, in combination with means to connect the front ends of the side members together, clamp-plates detachably secured to the heel-lugs and having outturned flanges bearing on the upper side of the shoe, and calks having screw-shanks engaging threaded openings in the heel-lugs and bearing against the under side of the shoe, substantially as described.

In testimony that I claim the foregoing as my own I have hereto affixed my signature in the presence of two witnesses.

DAVID WESLEY BARR.

Witnesses:
HARRY J. FERGUSON,
J. I. MCVAY.